CARBON CONTENT ANALYSIS
Geoffrey Long, Abingdon, England, assignor to United Kingdom Atomic Energy Authority, London, England
Filed June 9, 1970, Ser. No. 44,727
Claims priority, application Great Britain, June 13, 1969, 30,211/69
Int. Cl. G01n 7/10
U.S. Cl. 23—254 R    10 Claims

ABSTRACT OF THE DISCLOSURE

An enclosure of a metal in which carbon is soluble and mobile at the operating temperature is inserted into the gas atmosphere of a furnace. Hydrogen (in excess) and carbon from the furnace atmosphere permeate to the interior of the enclosure and there react to form methane. Measurement of the methane concentration in the enclosure provides an indication of carbon content in the gas atmosphere.

BACKGROUND OF THE INVENTION

The present invention relates to a device for measuring the carbon content of gas furnace atmospheres.

It is known that when, for example, steel articles have been made, the process of manufacture frequently introduces work hardening which must be relieved, and to this end the articles are normally annealed for an appropriate length of time. The atmosphere in the annealing furnace must be such as to cause no carburising or decarburising of the steel and this atmosphere is normally provided by the incomplete combustion of fuel gas. The atmosphere therefore contains, in practice, methane, carbon monoxide, carbon dioxide, hydrogen and water vapour, the various constituents being present in a complex equilibrium state. In order to ensure that the carburising potential of the atmosphere is correct, it is necessary to measure this potential from time to time but unfortunately this has hitherto proved difficult, since existing methods, for example chemical analysis of the gas atmosphere, give data which are only indirectly related to the required carburising potential. It is therefore extremely desirable to provide a device for measuring the effective carbon content of the atmosphere within the furnace.

SUMMARY OF THE INVENTION

The invention provides a device for measuring the carbon content of gas furnace atmospheres which also contain hydrogen, which device comprises an enclosure for insertion into the furnace atmosphere, the enclosure comprising a material which is permeable to hydrogen and in which carbon is both soluble and mobile at the operating temperature whereby methane is formed in the interior of the said enclosure, and means for measuring the production of methane.

The enclosure may comprise iron, nickel, or their alloys. In these materials, the effective permeability of the carbon is much lower than the effective permeability of hydrogen at the operating temperature, so that there is an excess of hydrogen at the inner surface of the enclosure and all the carbon will be able to react with the hydrogen to form methane.

It will be realised that the reactions taking place within the furnace are equilibrium reactions which can be represented by:

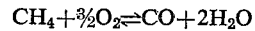
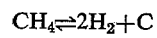

The equilibrium positions of these reactions depend upon the redox and carburising potentials within the furnace. It is difficult to withdraw a sample from the furnace atmosphere as at least the second of these equilibrium reactions is liable to change its position during cooling. However, by using the process upon which the present invention is based, the third reaction is caused to take place also within the enclosure and this reaction does not change its equilibrium position on being cooled. Moreover, as explained, there is always an excess of hydrogen present within the enclosure so that, within the enclosure, the reaction is driven in the left-hand direction. These effects are readily calculated so that, by measuring the methane concentration within the enclosure, the carburising potential within the furnace atmosphere can be determined.

Essentially, the methane concentration can be measured either by a static or a dynamic method, and in the static method the contents of the enclosure are allowed to react so that the methane concentration within the enclosure is in equilibrium with the carbon concentration at the inner surface of the enclosure. In practice, the methane is withdrawn from the enclosure at a rate less than that rate at which it is formed and analysed, for example, by means of a gas chromatograph.

In the dynamic method, on the other hand, the methane concentration within the enclosure is effectively zero and the rate of formation of methane is measured to give a measure of the carbon activity gradient across the wall of the enclosure and hence the carburising potential within the furnace atmosphere. This state of affairs is most easily achieved either by pumping off the methane as it is formed, using either a vacuum system or an inert sweep gas, the term "inert" being used to mean a gas which does not react with either carbon or hydrogen. The sweep gas is conveniently argon.

DESCRIPTION OF PREFERRED EMBODIMENTS

Specific constructions of device embodying the invention will now be described by way of example and with reference to the accompanying drawings in which.

In both examples, measurement of methane concentration is by a dynamic technique.

Figure 1:
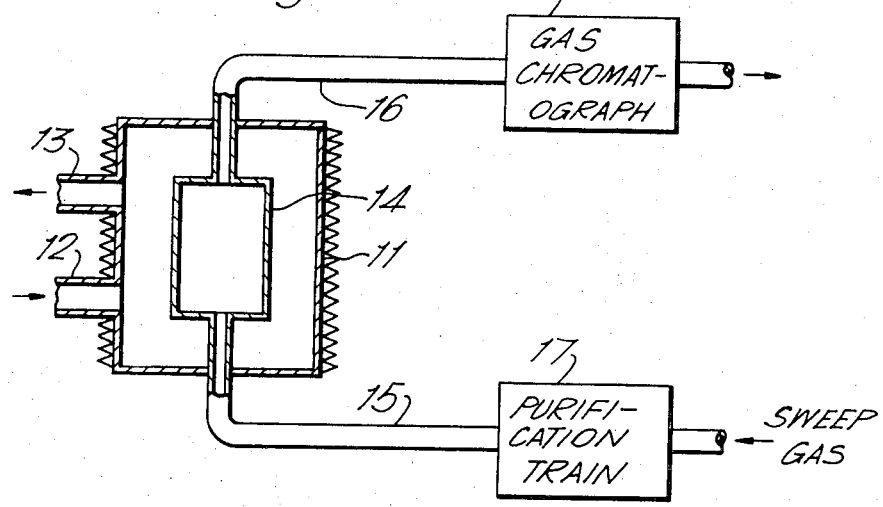
FIG. 1 is a diagrammatic representation of a device.

Referring to FIG. 1, the furnace is represented by 11 and provision for a furnace gas feed is represented by inlet and outlet pipes 12, 13 respectively.

Within the furnace is mounted a metallic enclosure provided by a thin-walled thimble 14 of iron, nickel or an alloy of iron or nickel.

Pipelines 15, 16 respectively couple the thimble 14 to a supply of inert sweep gas via a standard purification train 17 and, on the outlet side, to a gas chromatograph 18.

In operation, hydrogen and carbon in the furnace gases permeate through the metal of the thimble 14 and react at the interior of the thimble 14 to form methane. The methane is swept away as fast as it is formed by the sweep gas and analysis for methane concentration made with the gas chromatograph 18. As explained above, the relationship between this measured methane concentration and the carburising potential of the furnace gases is readily calculated from the known solubility and mobility of carbon in the thimble material at the operating temperature, and the dimensions of the thimble walls.

Figure 2:
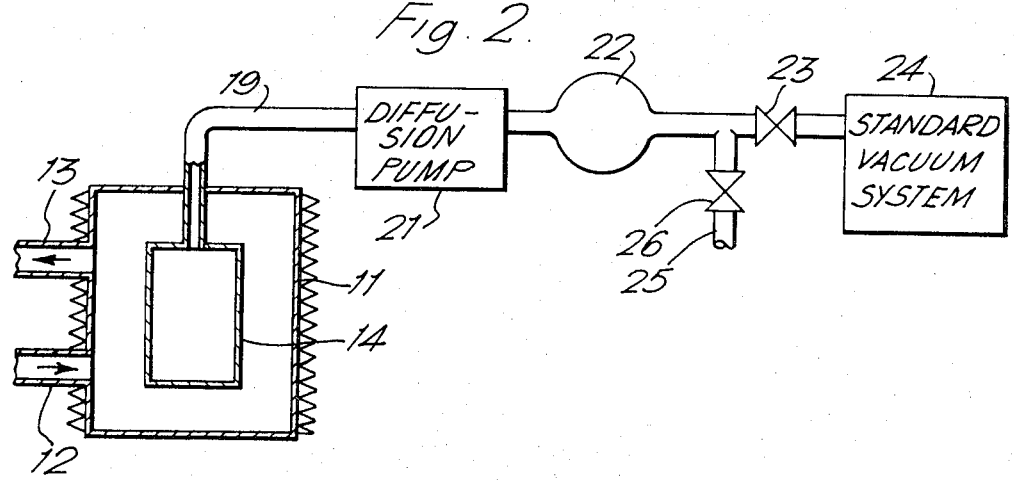
FIG. 2 is a diagrammatic representation of another device.

In the example of FIG. 2, the furnace and thimble, being closely similar to the FIG. 1 arrangement, are referenced with the same numerals. The thimble 14 differs in FIG. 2 in having only an outlet pipe 19 connected.

Methane is removed from the thimble 14 as fast as it forms by pumping out using a vacuum system.

A diffusion pump 21 pumps the methane into a collection volume 22, which can be cleared periodically by coupling, via valve 23, with a standard vacuum system 24. A pipeline 25, with valve 26, is provided for periodic withdrawal of gas samples for analysis, for example by a gas chromatograph.

The invention is not restricted to the details of the foregoing example.

I claim:
1. A device for measuring the carbon content of gas furnace atmospheres which also contain hydrogen, which device comprises an enclosure for insertion into the furnace atmosphere, the enclosure comprising a material which is permeable to hydrogen and in which carbon is both soluble and mobile at the operating temperature such that hydrogen and carbon from a gas furnace atmosphere will permeate through the material of the enclosure, said enclosure being constructed and arranged such that it is substantially isolated in its interior from any hydrogen other than said permeated hydrogen, whereby methane is formed in the interior of the said enclosure from said permeated hydrogen and carbon, and means for measuring the production of methane so formed.

2. A device as claimed in claim 1, wherein the enclosure comprises iron, or an alloy thereof.

3. A device as claimed in claim 1, wherein the enclosure comprises nickel, or an alloy thereof.

4. A device as claimed in claim 1, wherein means are provided for withdrawing methane from the enclosure as fast as it is formed therein and for supplying the methane to means for measuring the methane concentration.

5. A device as claimed in claim 4, wherein the means for withdrawing methane from the enclosure comprise means for driving a flow of sweep gas through the enclosure.

6. A device as claimed in claim 4, wherein the means for withdrawing methane from the enclosure comprises a vacuum system.

7. A method of measuring the carbon content of gas furnace atmospheres which also contain hydrogen, which comprises inserting into the furnace atmosphere an enclosure comprising a material which is permeable to hydrogen and in which carbon is both soluble and mobile at the operating temperature such that hydrogen and carbon from the gas furnace atmosphere permeate through the material of the enclosure, maintaining the interior of the enclosure substantially isolated from any other exterior hydrogen source, whereby methane is formed in the interior of the said enclosure from said permeated hydrogen and carbon, and measuring the production of methane so formed.

8. A method as claimed in claim 7 wherein methane is withdrawn from the enclosure as fast as it is formed therein, and is supplied to means for measuring the methane concentration.

9. A method as claimed in claim 7 wherein methane is withdrawn from the enclosure as fast as it is formed therein by driving a flow of sweep gas through the enclosure, and then the methane is supplied to a means for measuring the methane concentration.

10. A method as claimed in claim 7 wherein methane is withdrawn from the enclosure as fast as it is formed therein by means of a vacuum system, and then the methane is supplied to a means for measuring the methane concentration.

References Cited

UNITED STATES PATENTS

| | | | |
|---|---|---|---|
| 2,909,919 | 10/1959 | Myer | 73—23 |
| 3,451,256 | 6/1969 | Kolodney | 23—254 R |

MORRIS O. WOLK, Primary Examiner

R. M. REESE, Assistant Examiner

U.S. Cl. X.R.

23—232 R; 73—19, 23